No. 613,881. Patented Nov. 8, 1898.
C. M. GREEN.
GENERATING AND DISTRIBUTING ELECTRIC ENERGY.
(Application filed Dec. 23, 1896.)
(No Model.) 2 Sheets—Sheet 1.
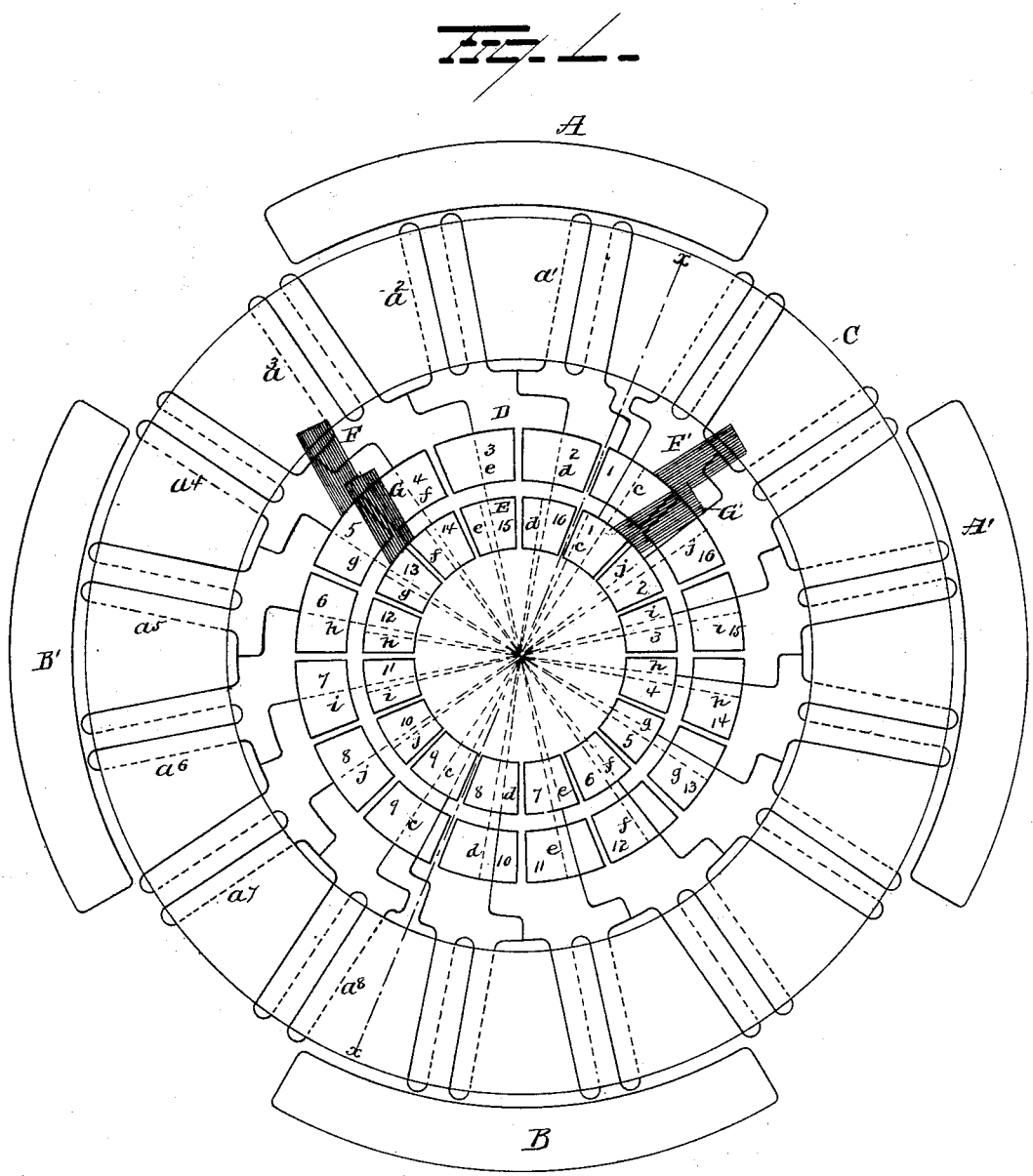
Witnesses
E. J. Nottingham
G. F. Downing
Inventor
C. M. Green
By H. A. Seymour
Attorney No. 613,881. Patented Nov. 8, 1898.
C. M. GREEN.
GENERATING AND DISTRIBUTING ELECTRIC ENERGY.
(Application filed Dec. 23, 1896.)
(No Model.) 2 Sheets—Sheet 2.
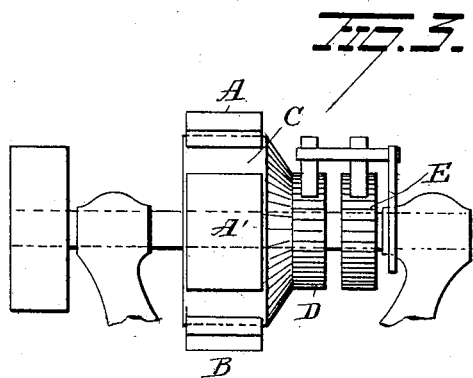
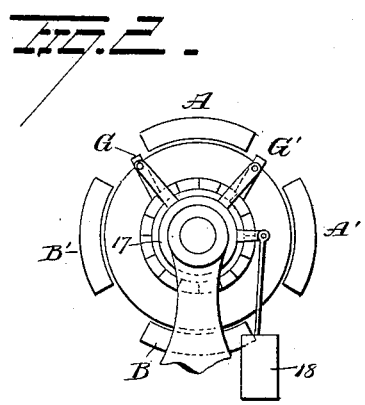
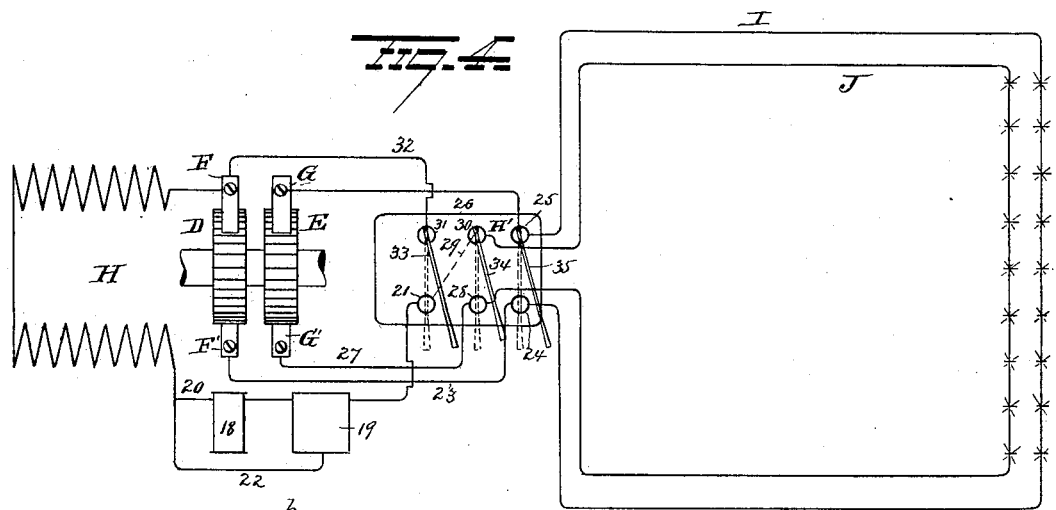
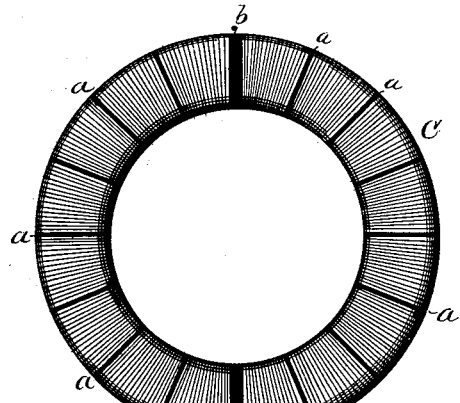
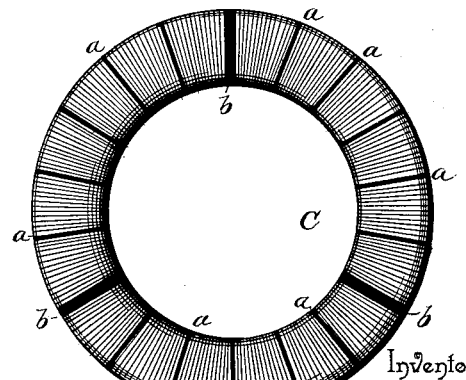

UNITED STATES PATENT OFFICE.

CHARLES M. GREEN, OF CLEVELAND, OHIO, ASSIGNOR TO THE GENERAL ELECTRIC COMPANY, OF NEW YORK.

GENERATING AND DISTRIBUTING ELECTRIC ENERGY.

SPECIFICATION forming part of Letters Patent No. 613,881, dated November 8, 1898.

Application filed December 23, 1896. Serial No. 616,764. (No model.)

*To all whom it may concern:*

Be it known that I, CHARLES M. GREEN, a resident of Cleveland, in the county of Cuyahoga and State of Ohio, have invented certain new and useful Improvements in the Generation and Distribution of Electric Energy; and I do hereby declare the following to be a full, clear, and exact description of the invention, such as will enable others skilled in the art to which it appertains to make and use the same.

My invention relates to an improvement in the generation and distribution of electric energy, the object of the invention being to so construct the armature of a dynamo-electric machine that two or more separate external circuits can be taken therefrom in such manner that the electromotive force supplied to each external circuit shall be generated in a particular set of the armature-coils, so that the difference in potential between any two points of said external circuits or the machine may be reduced to and maintained at any desired amount, thus permitting the use with safety of dynamo-electric machines capable of generating currents of high electromotive force.

A further object is to construct the armature of a dynamo-electric machine in such manner that the coils shall be arranged in groups or sets so disposed relatively to each other that the difference in potential between two coils of any group or set shall be low, whereby thin or small insulation between the coils of each group or set will suffice and result in reducing the weight and size of the armature without detracting from the efficiency of the machine.

A further object is to provide means whereby a closed-coil armature can be made to generate electromotive force and distribute the same in subdivided external circuits each of which shall be in series with the others and with subdivisions of the armature.

With these objects in view the invention consists in generating electromotive force in two or more sets or groups of armature-coils of a closed-coil armature and in distributing the electromotive force so generated in separate external circuits having translating devices included therein, said external circuits being connected between and included in series with the sets or groups of armature-coils.

My invention further consists in the combination, with a dynamo-electric machine having a closed-coil armature divided into two or more sets of coils or bobbins and a commutator for each set of coils, some of the segments of each commutator being connected with terminals of one set of coils and cross-connected with the balance of the segments of the respective commutators, of external circuits corresponding in number with the number of sets of armature-coils, said external circuits being connected between and included in series with the respective sets of armature-coils and with each other.

My invention further consists in certain novel features of construction and combinations and arrangements of parts, as hereinafter set forth, and pointed out in the claims.

In the accompanying drawings, Figure 1 is a view illustrating the armature and commutator connections. Fig. 2 is an end view. Fig. 3 is a side elevation. Fig. 4 is a diagrammatical view. Fig. 5 is an elevation of an armature, showing the manner of insulation. Fig. 6 is a view showing an armature with the coils divided into three sets or groups.

In Fig. 1 I have shown a multipolar machine having four pole-pieces A A' B B' and a ring-armature C having two sets or groups of closed coils. All the coils or bobbins of each set or group are electrically connected together, and the separate coils of each set are separated from each other by means of thin insulating strips or disks $a$, and the sets or groups of coils are separated from each other by heavier insulating strips or disks $b$, all of which will be hereinafter more fully explained.

With an armature having its coils divided into two sets or groups I employ two commutators D E, one for each set or group. In Fig. 1 the line $xx$ represents the division-line between the two sets of coils. The terminals of all the coils on one side of this line (which constitute one set of coils) are electrically connected with the adjacent segments of commutator D, and the terminals of the coils of the other set are similarly connected with adjacent segments of commutator E. In other words, the terminals of the coils $a'$, $a^2$, $a^3$, $a^4$, $a^5$, $a^6$, $a^7$, and $a^8$ are connected successively with the segments 1, 2, 3, 4, 5, 6, 7, 8, and 9 of commutator D. The segments 1 and 9 are cross-connected by means of a conductor $c$. Segments 2, 3, 4, 5, 6, 7, and 8 are cross-connected with the remaining segments 10, 11, 12, 13, 14, 15, and 16 of commutator D by means of conductors $d\ e\ f\ g\ h\ i\ j$. The coils of the other set or group are connected with segments of the commutator E, and said segments are cross-connected in exactly the same manner as above explained in connection with commutator D and the set of coils connected therewith.

Commutator-brushes F F' bear on the segments of commutator D, and as said segments are cross-connected and have electrical connection with one set of armature-coils said brushes will serve continuously to collect current generated in said set of coils during the operation of the machine. Commutator-brushes G G bear against the commutator E and collect current in like manner generated in the other set of coils. The commutator-brushes are mounted on a suitable yoke 17, and the latter is connected with an automatic regulator 18, which serves to shift the brushes and automatically vary and regulate the output of electromotive force to correspond to the work or resistance that may be included in the external or working circuits. A "wall-regulator" 19 may also be employed to automatically shunt some of the current around the regulator 18. I have not deemed it necessary to illustrate or describe in detail the construction or mode of operation of said regulators 18 19, because such devices are well known, and any preferred construction may be employed.

Instead of dividing the armature-coils into two groups, as above described, and shown in Fig. 1, the coils may for a six-pole machine be divided into three groups and a corresponding number of commutators provided, as shown in Fig. 6, no attempt being made in this figure, however, to show the commutator and its connections, as the arrangement will be substantially the same as above described. It is apparent also that for an eight-pole machine the armature-coils may be divided into four groups and a commutator provided for each group.

External or working circuits corresponding in number with the number of sets of coils in the armature of the machine are employed and are so arranged as to be connected between and included in series with the sets or groups of coils or bobbins. In the diagrammatical view Fig. 4 the commutator-brush F is shown connected with one end of the field-magnet coils H, and the other end of the field-magnet coils is connected by a conductor 20 and through the regulators 18 19 with a contact-post 21 of a switchboard H'. A shunt-circuit 22 extends from the wall-regulator 19 around the main regulator 18. The commutator-brush F' is connected by a conductor 23 with a contact-post 24 of the switchboard, and another contact-post 25 is connected by a wire 26 with the commutator-brush G. The brush G' is connected by a conductor 27 with a contact-post 28 of the switchboard. The contact-post 21 is connected by a conductor 29 with a contact-post 30. Another contact-post 31 is connected by a conductor 32 with the commutator-brush F. The contact-posts of the switchboard are arranged in pairs, and the posts of each pair are adapted to be bridged by switch-arms 33 34 35. The terminals of the external circuit I are connected with the contact-posts 24 25 of the switchboard, and the terminals of the other external circuit J are connected with the contact-posts 28 30. From this construction it is apparent that when all the switches are open the two external circuits will be in series with each other and with the two sets or groups of armature-coils of the dynamo-electro machine. By means of the switch-arms 34 35 the working circuits may be short-circuited, and by means of the switch-arm 33 the machine can be rendered inactive by short-circuiting the field-magnet coils.

With all the switches open the circuits may be traced as follows: beginning with the commutator-brush F, through commutator D and the set of armature-coils connected therewith, to brush F', then by conductor 23 to post 24 of the switchboard, then through external circuit I to post 25, then by conductor 26 to brush G, then through commutator E and the set of armature-coils connected therewith to commutator G', then by conductor 27 to post 28 of the switchboard, then through the external circuit J to contact-post 30, then by conductor 29 to post 21, then by conductor 20 through the regulators 18 19 and to one end of the field-magnet coils, and then from the other end of the latter to the commutator-brush F. Thus all the electromotive force generated in one set or group of armature-coils will flow through the external circuit I and the translating devices included therein, and all the electromotive force generated in the other set or group of armature-coils will flow through the external circuit J and the translating devices included in that circuit.

When it is desired to render the machine inactive, the switch 33 will be made to connect posts 21 31, whereupon the field-magnet coils will be short-circuited through the conductor 32.

In the case of a six-pole machine having its armature-coils divided into three groups three external circuits will be employed, and in an eight-pole machine having the armature-coils divided into four groups four external circuits will be employed, and in each case a corresponding number of commutators will be used and connected in series with the external circuits in the manner above explained. In each external circuit translating devices are included, and for the sake of illustration it may be assumed that in each circuit there are included forty arc-lamps of fifty volts each, so that the load of each external circuit will nearly balance the electromotive force generated in each of the sets or groups of coils of the armature, the total capacity of the dynamo shown in Fig. 1 of the drawings being assumed to be between four thousand and five thousand volts. The above conditions are desirable in practice; but they are not essential, since any one or more of the circuits may be cut out or any number of lamps in either one of the circuits may be included, in which case the automatic regulator will operate to cut down the total output of electromotive force generated by all the coils of the armature to correspond to and operate the remaining lamps in circuit. It is of course understood that the figures above given are for the purpose of illustration merely, although they closely approximate the conditions that exist in actual practice, and that in practice the machine will have a capacity for generating an amount of electromotive force somewhat in excess of the amount expended in operating the lamps or other translating devices in the external circuits. It will be found that the difference of potential between any two points on the machine or in the external circuits will but slightly exceed two thousand volts, notwithstanding that the machine shown in Fig. 1 is capable of generating a total electromotive force of four thousand volts or more.

By arranging the armature coils or bobbins in groups, as hereinbefore explained, so that each group will generate an electromotive force which will be commutated and distributed in a separate external circuit, the difference of potential between the coils will be low, and consequently very light insulation $a$ between the coils or bobbins will suffice, and thus the weight and size of the armature will be reduced to a minimum without detracting from the efficiency of the machine. Heavier insulation $b$ will of course be employed between the sets or groups of coils.

In this patent I do not broadly claim a system of electric generation and distribution consisting of generating electromotive force in two or more sets or groups of armature-coils and distributing the electromotive force so generated in separate external circuits having translating devices included therein, said external circuits being connected between and included in series with the separate sets or groups of armature-coils of a dynamo-electric machine, such invention being covered broadly by claims in my pending application, Serial No. 588,108, and is reserved to be protected by the patent granted thereon, the invention of this patent being for the protection of such a system of generation and distribution of electric energy only when a generator is employed having a "closed-coil armature" divided into two or more sets or groups of armature-coils and external circuits connected between and included in series with the sets or groups of armature-coils, such specific embodiment of the broad invention of my pending application not being disclosed therein.

Having fully described my invention, what I claim as new, and desire to secure by Letters Patent, is—

1. A system of electric generation and distribution consisting in generating electromotive force in two or more sets or groups of armature-coils of a closed-coil armature and in distributing the electromotive force so generated in separate external circuits having translating devices included therein, said external circuits being connected between and included in series with the sets or groups of armature-coils, substantially as set forth.

2. The combination with a dynamo-electric machine having a closed-coil armature divided into two or more sets of coils or bobbins and a commutator for each set of coils, some of the segments of each commutator being connected with terminals of one set of coils and cross-connected with the balance of the segments of the respective commutators, of external circuits corresponding in number with the number of sets of armature-coils, said external circuits being connected between and included in series with the respective sets of armature-coils and with each other, substantially as set forth.

3. The combination in a dynamo-electric machine, of an armature having its coils or bobbins divided into two or more successive or adjoining sets, light insulation between the individual coils or bobbins of each set and heavier insulation between the sets of coils or bobbins, substantially as set forth.

4. The combination in a dynamo-electric machine having a closed-coil armature divided into two or more sets of coils or bobbins and a commutator for each set of coils, of lighting or working circuits corresponding in number with the number of sets of armature-coils, said working circuits being connected between and included in series with the respective sets of armature-coils and with each other, and an automatic regulator for varying the electromotive force of the current generated to correspond with work included in said working circuits, substantially as set forth.

In testimony whereof I have signed this specification in the presence of two subscribing witnesses.

CHARLES M. GREEN.

Witnesses:
S. M. HAMILL,
H. J. DOUDS.